(12) United States Patent
Heidecke

(10) Patent No.: US 6,249,244 B1
(45) Date of Patent: Jun. 19, 2001

(54) APPARATUS FOR THE DETERMINATION OF THE FILL STATE OF MATERIAL IN A CONTAINER

(75) Inventor: Frank Heidecke, Freiburg (DE)

(73) Assignee: Endress + Hauser GmbH + Co., Meulburg (DE)

( * ) Notice: Subject to any disclaimer, the term of this patent is extended or adjusted under 35 U.S.C. 154(b) by 0 days.

(21) Appl. No.: 09/427,338

(22) Filed: Oct. 26, 1999

(30) Foreign Application Priority Data

Jul. 29, 1999 (DE) .............................................. 199 35 646

(51) Int. Cl.⁷ ....................................................... G01S 13/08
(52) U.S. Cl. ............................................. 342/124; 367/908
(58) Field of Search ..................................... 342/123, 124; 367/908; 73/290 V, 290 R

(56) References Cited

U.S. PATENT DOCUMENTS 5,504,490 * 4/1996 Brendle et al. ....................... 342/124
5,609,059 * 3/1997 McEwan ............................ 73/290 R
5,614,911 * 3/1997 Otto et al. ............................ 342/124

* cited by examiner

Primary Examiner—Ian J. Lobo
(74) Attorney, Agent, or Firm—Bose McKinney & Evans LLP

(57) ABSTRACT

This invention relates to an apparatus for the determination of the fill state of solid or liquid material in a container with a signal-generating/transmitting unit, a receiving unit, a time-delay circuit which transforms the high-frequency signals into low-frequency signals, and an evaluating unit. The invention includes a time-delay circuit having a first circuit element with a time constant $r_1$ driven by input pulses in synchronization with the transmission repetition frequency ($f_1$) and which generates a non-linear output signal, a second circuit element with a time constant ($T_2$) greater than time constant ($T_1$) driven by input pulses with a frequency ($f_2$) which is less than the transmission repetition frequency ($f_1$) and which generates a non-linear output signal, and a third circuit element which detects in each period of the transmission repetition frequency ($f_1$) an intersection of the output signal of the first circuit element and the output signal of the second circuit element and supplies an output signal to an evaluation unit to determine the fill state of the material in the container.

13 Claims, 3 Drawing Sheets

APPARATUS FOR THE DETERMINATION OF THE FILL STATE OF MATERIAL IN A CONTAINER

BACKGROUND OF THE INVENTION

This invention relates to an apparatus for the determination of the fill state of solid or liquid material in a container with a signal generating/transmitting unit which generates high-frequency signals with a predetermined transmission repetition frequency and transmits them in the direction of the surface of material. The high-frequency signals are reflected at the surface of the material and a receiving unit receives the reflected signals. A time-delay circuit transforms the high-frequency signals into low-frequency signals and an evaluating unit determines the fill state in the container using the transit time of the signals.

Processes for the determination of the fill state using the transit time of signals exploit behavior following the laws of physics according to which the transit interval is equal to the product of the transit time and propagation speed. In the case of fill state measurement the transit interval corresponds to twice the distance between the antenna and the surface of the material. The actual effective echo signal and its transit time are determined with the aid of the so-called echo function, the digital envelope curve or the low-frequency signals where the envelope curve or the low-frequency signals reproduce the amplitudes of the echo signals as a function of the distance from the antenna to the surface of the material. The fill state itself can then be determined from the difference between the known distance of the antenna from the base of the container and the distance of the surface of the material from the antenna as determined by the measurement.

In DE 31 07 444 A1 a high-resolution pulse radar process is described. A generator generates first microwave pulses and radiates them via an antenna with a predetermined transmission repetition frequency in the direction of the surface of the material. An additional generator generates reference microwave pulses which are equal to the first microwave pulses but differ slightly from them in their transmission repetition rates. The echo signal and the reference signal are mixed. At the output of the mixer an intermediate frequency signal is present. The intermediate frequency signal has the same curve as the echo signal but is extended with respect to it by a time-delay factor which is equal to a quotient of the transmission repetition factor and the frequency difference between the first microwave pulses and the reference microwave pulses. For a transmission repetition frequency of several megahertz, a frequency difference of a few hertz, and a microwave frequency of several gigahertz, the frequency of the intermediate frequency signal lies below 100 kHz. The advantage of using the intermediate frequency is that relatively slow and therefore cost-effective electronic components can be used for the monitoring of signals and/or signal evaluation.

Determination of the time extension or time delay by means of sequential sampling assumes that the time differential between two sampling points is always the same. Until now two processes were known which are suitable for the satisfying of this requirement: the mixer principle and the ramp principle. The ramp principle quantizes and works only approximately continuously.

In the case of the mixer principle two oscillators generate two oscillations with slightly different frequencies. By the slight "detuning" of the two oscillations a phase shift, which increases linearly with each period, arises which corresponds to a linearly increasing time delay.

A disadvantage of the mixer principle is the relatively high power consumption so that the power supply of a 4–20 mA current loop is only possible in the case of measurement rates of one measured value per second. Furthermore, disproportionately high demands must be made on the hardware and software in order to maintain the same time differential between the sampling points.

The mixer principle provides a comparatively small number of measured values per meter for sequential sampling. The result of this is low sensitivity of measurement for measurements with microwave pulses.

In the case of the ramp principle the same time differential from sampling point to sampling point is generated with the assistance of an RC circuit. The RC circuit is preset by a step voltage or linearly increasing ramp voltage, and therefore receives a certain offset, and is then charged and discharged in the rhythm of the transmission repetition frequency. The voltage offset in the RC circuits increases with increasing ramp voltage whereby reaching the operating point is delayed as a function of the level of the ramp voltage.

In the case of the ramp principle the time extension factor is critically dependent on the time constant of an RC circuit. The dependence of the RC circuit on the temperature has, depending on circuit technology, a great effect on the scaling of the time transformation. In order to eliminate this problem it is necessary to compensate for the temperature-dependent changes via a control circuit. However, even with this control circuit the scaling of the time transformation changes with the temperature in such a way that requirements for highly precise measurements are not fulfilled. A disadvantage of the ramp principle is furthermore the high expenditure which must be made for the generation of the ramp voltage.

BRIEF SUMMARY OF THE INVENTION

It is an objective of the present invention to provide a highly precise and cost-effective time-delay circuit for use in the determination of the fill state of solid or liquid materials.

The objective is realized according to the present invention by a time-delay circuit including a first circuit element having a time constant $T_1$ which is driven by pulses synchronized with the transmission repetition frequency and which generates a non-linear output signal, a second circuit element having a time constant $T_2$ ($T_1 << T_2$) which is driven by pulses whose clock frequency is smaller than the transmission repetition frequency and which generates a non-linear output signal, and a third circuit element which detects in each period of the transmission repetition frequency the intersection between the output signal of the first circuit element and the output signal of the second circuit element and supplies an output signal to an evaluation unit.

According to the present invention a circuit is provided which insures that the pulses which are present at the input of the first circuit element and the second circuit element have the same voltage level and the same ramp behavior.

A feature of the present invention is that the time-delay circuit is constructed of very few circuit elements. It is thus correspondingly cost-effective. Moreover it is substantially insensitive to changes of the external parameters such as, say, temperature. It is thus suitable for precise fill state measurements.

In order to reduce the discharge time of the second circuit element an electronic component, for example a resistor, is connected to the second circuit element. If the output signal of the second circuit element reaches a predetermined voltage value the second circuit element is connected in series with the electronic component via a switch. The second circuit element is discharged, where the discharge time can be optimized as a function of the resistance connected.

Another cost-effective feature of the apparatus according to the present invention is that the third circuit element is a comparator. Further, the evaluating unit contains only the sampling points for the evaluation which arise by the intersections between the output signals of the first circuit element and the second circuit element and which lie in the linear operational range of the comparator. It has been shown that comparators work approximately linearly until the second circuit element has reached approx. 63% of its maximum charging voltage. For precise measurements a range of approximately 40% maximum of the maximum charging voltage of the second circuit element is preferred.

According to another feature of the present invention a first control circuit linearizes the sampling frequency of the low-frequency signal outside of the non-linear range. The sampling time points are then varied over time so that the time delay between two sampling time points following one after the other increases linearly.

An additional feature of the present invention which is particularly well suited to highly precise measurements is a second control circuit which holds the time extension or the time delay $\Delta t$ to a constant value.

Yet another feature of the present invention is a logical gate array at whose one input the periodic signal with the clock frequency of the measurement cycle is present and at whose second input the output signal of the third circuit element is present. The logical gate array may, for example, be an AND gate array.

The objective of the present invention is further realized according to an alternative embodiment where the time-delay circuit includes a first circuit element which generates a linear output signal with a first slope $m_1$ synchronized with the transmission repetition frequency, a second circuit element which generates a linear output signal with a second slope $m_2$, where $m_1 >> m_2$, and a third circuit element which detects in each period of the transmission repetition frequency the intersection between the output signal of the first circuit element and the output signal of the second circuit element and supplies an output signal to an evaluation unit.

According to the alternative embodiment, the first circuit element and the second circuit element include at least one saw-tooth generator and the third circuit element is a comparator. According to the present invention the desired time delay can be converted via components with an exponential as well as with a linear characteristic curve.

Other advantages and features will be apparent from the following description of the preferred embodiments of the present invention when considered in connection with the drawings forming a part of the disclosure of the invention.

BRIEF DESCRIPTION OF THE DRAWINGS

The invention will be explained in more detail with the aid of the following drawings. Shown are.

DETAILED DESCRIPTION OF PREFERRED EMBODIMENT

Figure 1:
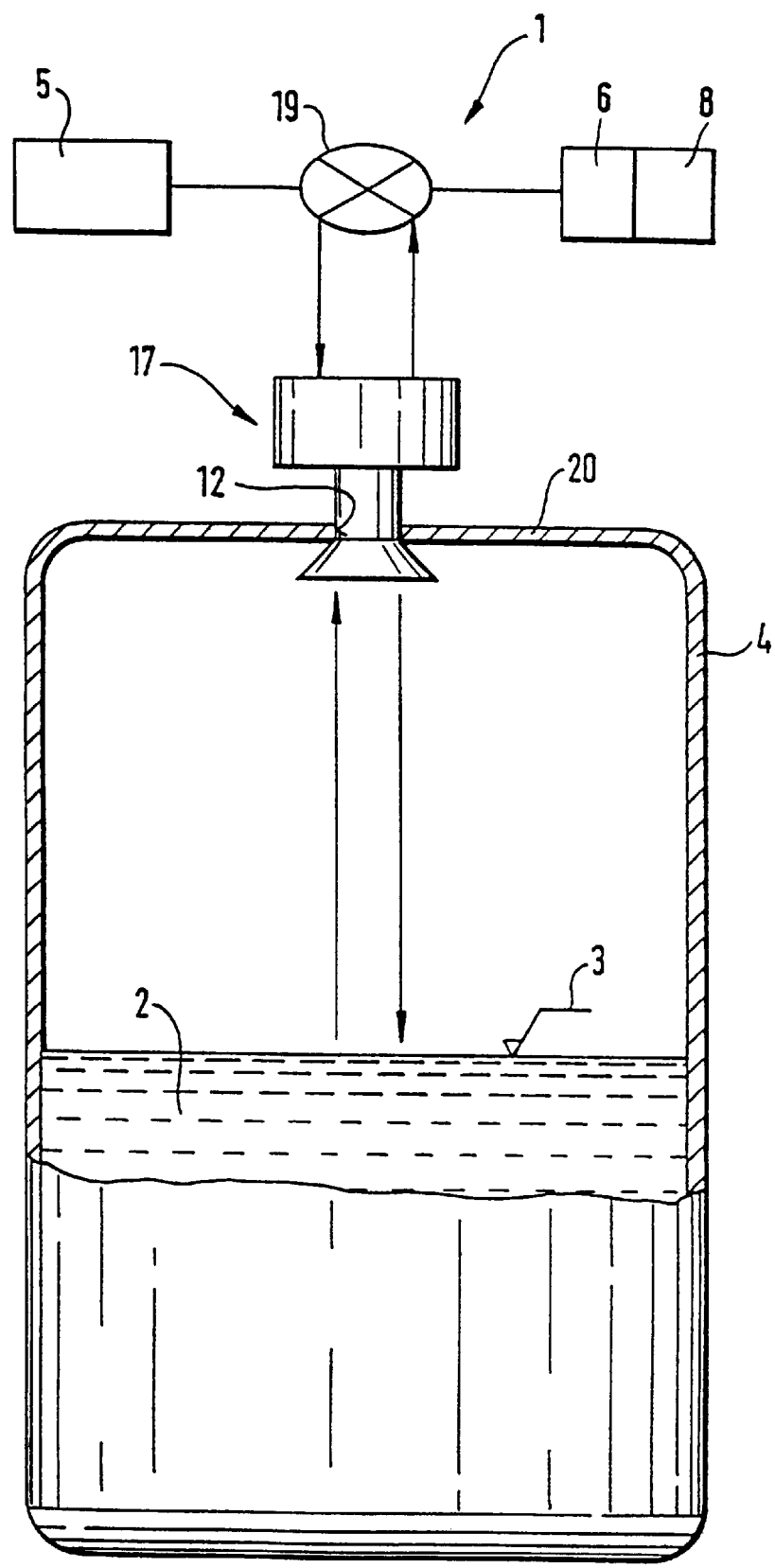
FIG. 1 is a schematic representation of an apparatus according to the present invention.

FIG. 1 shows a schematic representation of an apparatus according to the present invention. Solid or liquid material 2 is stored in a container 4. The fill state measuring device 1 which is mounted in an opening 12 in the cover 20 of the container 4 serves to determine the fill state. Through the antenna 17 signals generated in the signal generating/transmitting unit 5, in particular microwaves, are radiated in the direction of the surface 3 of the material 2. At the surface 3 the transmitted signals are partially reflected as echo signals. These echo signals are received and evaluated in the receiving/evaluating unit 8. As shown, a time-delay circuit 6 is also integrated with the receiving/evaluating unit 8. The correct timing of transmission of the transmitted signals and reception of the echo signals is done by the transmitting/receiving separating filter 19.

The apparatus 1 according to the present invention is not only usable in connection with antennas 17 which radiate the measurement signals into free space. In a plurality of fields of application, for example in petrochemicals, chemistry, and the food industry, highly precise measurements of the fill state of liquids or material in containers (tanks, silos, etc.) are required. Thus to an increasing extent measuring devices are coming into use in which short electromagnetic high-frequency pulses or continuous microwaves are transmitted through a conductive element and transmitted into the container in which the material are stored by means of the conductive element. The conductive element is, for example, a cable probe or a bar probe (not shown). Thus, the conductive medium according to the present invention may be either air or a conductive element such as a probe.

The method of measurement according to the present invention uses the principle that at the boundary layer between two different media, for example air and oil or air and water, as a consequence of the jump-like change (discontinuity) of the dielectric constant of both media, a part of the transmitted high-frequency pulses or the transmitted microwaves is reflected and transmitted via the conductive medium back into the receiving unit. The reflected pulses are greater as the difference in the dielectric constants of the two media is greater. With the aid of the transit time of the reflected portion of the high-frequency pulses or the microwaves the distance to the boundary layer can be determined. With the knowledge of the empty distance of the container the fill state of the material in the container can be calculated. A corresponding apparatus is, for example, described in U.S. Pat. No. 5,361,070. This process is known by the name TDR (time domain reflectrometry).

Figure 2:
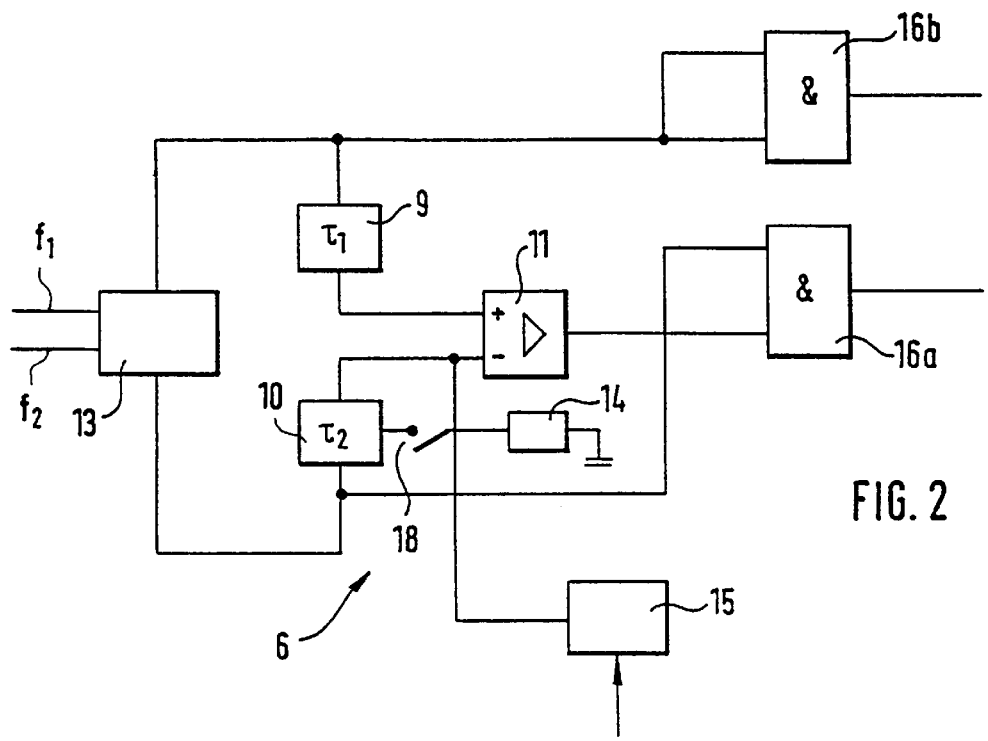
FIG. 2 is a block diagram of an embodiment of the time-delay circuit.

In FIG. 2 a block diagram of a first embodiment of a time-delay circuit 6 according to the present invention is shown. The square-wave pulses with the transmission repetition frequency $f_1$ and the clock frequency $f_2$ for one measuring cycle are generated by a square-wave generator (not shown). The voltage of the square-wave pulses is a predetermined voltage level which is present periodically for definite times at a first circuit element 9 or at a second circuit element 10. In the apparatus 1 according to the present invention, circuit 13 causes the square-wave pulses to have the same voltage level and the same ramp behavior. Circuit 13 is a NAND gate circuit well known to those skilled in the art and available from Motorola as part number 74HCT00.

The output signals of the first circuit element 9 and the second circuit element 10 are present at the two inputs of a third circuit element in which is a comparator 11. Comparator 11 detects the "intersections" between the two output signals of the circuit elements 9, 10. In order to accelerate the discharging time of the second circuit element 10 an electronic component 14, preferably a low-resistance resistor, is connected to the second circuit element 10 via a switch 18. Through a logical gate array 16a, 16b, the transmission pulses or the sampling pulses are supplied to the evaluating unit 8. In a preferred embodiment logical gate array 16a, 16b is an AND gate array. Circuit 15 is a voltage control oscillator available from National Semiconductor as part number LMC5xx.

In the present invention the first circuit element and the second circuit element are RC circuits which are characterized by the time constants $T_1=R_1 C_1$ and $T_2=R_2 C_2$. Accordingly, it is possible to realize a desired time extension factor via the corresponding choice of the time constants. Although preferred embodiments of the present invention use RC circuits it will be apparent to those skilled in the art that other circuit elements with exponential characteristic curves can also be used.

Although the RC circuits have an undesirable temperature dependence, the effect is much less in the case of the present invention than in the case of the ramp principle previously described. The reasons for this are that if temperature changes occur, both RC circuits drift in the same direction. Moreover the difference of the two temperature drifts has no effect because of the use of the third circuit element or comparator. In this way a self-compensation results so that the measurement errors remain small. Consequently, in the embodiment shown in FIG. 2, an additional control circuit for the compensation of the temperature drift of the RC circuits is net needed.

The linear connection between the transmission repetition frequency and the time change which is the same from period to period can be illustrated mathematically in a simple and at the same time particularly compelling way. If the first RC circuit is characterized by the time constant $T_1=R_1C_1$ and the second RC circuit is characterized by the time constant $T_2=R_2C_2$., then at the input of the first RC circuit square-wave pulses are present with the transmission repetition frequency $f_1$ of one measurement cycle while at the input of the second RC circuit square-wave pulses are present with the transmission repetition frequency $f_2$ of one measurement cycle where $f_1 \ll f_2$. Furthermore, the voltage signals which are present at the first RC circuit and the second RC circuit have the same voltage level and the same ramp behavior.

The curve of the response output signal as a function of time $U_1(t)$ of the first RC circuit can then be represented by the following equation:

$$U_1(t)=U_o*(1-\exp(-(t-n*T_1)T_1)).$$

The response output signal $U_2(t)$ which is present at the output of the second RC circuit is as follows:

$$U_2(t)=U_o*(1-\exp(t/T_2)).$$

Herein $U_o$ denotes the maximum voltage level of both square-wave pulses and T the period of the high-frequency voltage pulses with the transmission repetition frequency $f_1$.N is a positive integer.

For the calculation of the intersections of the output signals from the RC circuits, the two output signals $U_1(t)$ and $U_2(t)$ are set equal. Furthermore the following calculation is carried out under the assumption that $U_0$ in both cases has the same voltage level. Under this assumption $U_0$ drops out upon making equal the two terms on both sides of the equality sign. As a result of making both terms equal it follows that:

$$(t-n*T_1)/T_1=t/T_2.$$

By corresponding reformulation the time extension or the time delay $\Delta t$ can be represented according to the following:

$$\Delta t=n*T_1*(T_2/(T_2-T_1)-1)$$

Accordingly, nothing more than that the time delay $\Delta t$ of the time-delay circuit of the invention increases linearly with time. The proportionality constant and thus the degree of the delay is determined by the time constants of the RC circuits and can consequently be adjusted arbitrarily to the particular of application by suitable choice of the resistors and capacitors of the RC circuit.

Figure 3:
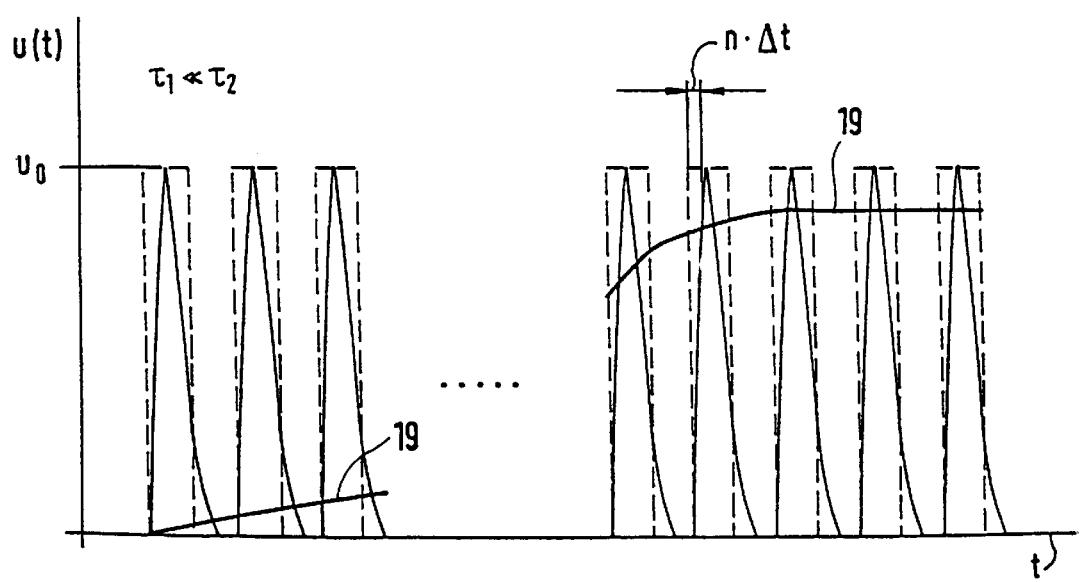
FIG. 3 is the signal curve of the circuit elements shown in FIG. 2.

FIG. 3 shows the signal curves U(t) of the RC circuits 9 and 10 shown in FIG. 2. $U_0$ is the level of the voltage pulses which are present at the first RC circuit 9 and the second RC circuit 10. The square-wave pulses with the transmission repetition frequency $f_1$ are represented by the dotted line. The response output signal 19 of the first RC circuit 9 to the square-wave pulses with the transmission repetition frequency $f_1$ are also shown in FIG. 3 (drawn-through lines). The response output signal to the square-wave pulse present at the second RC circuit 10 is the same as response signal 19 shown in FIG. 3. Since the time constant $r_2$ of the second RC circuit 10 is much greater than the time constant $T_1$ of the first RC circuit 9 the output signal of the second RC circuit 10 ramps slowly so that both output signals intersect in each period n of the transmission repetition frequency $f_1$. The delay time $\Delta t$ between the rising edge of the output signal of the comparator 11 and the transmission repetition frequency $f_1$ increases continuously.

Figure 4:
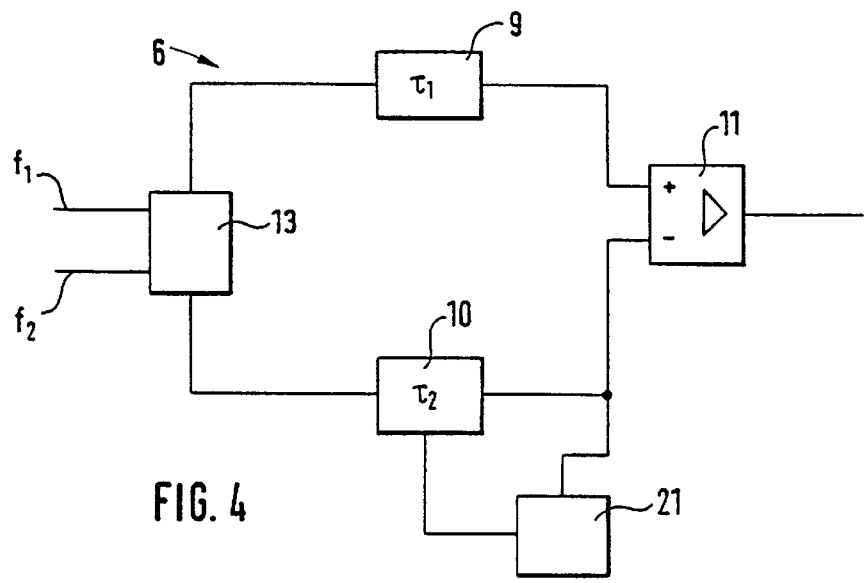
FIG. 4 is a block diagram of the time-delay circuit according to the present invention with control of the time constants of the RC circuits.

FIG. 4 shows a block diagram of a time-delay circuit 6 according to the present invention with control of the time constant $T_2$ of the RC circuit 10. The control of the time constant $T_2$ is done by the control circuit 21. The self-compensation of the present invention is done in the case of temperature changes in a plurality of cases under the assumption that both RC circuits, in particular the capacitors used, are of equal quality. RC circuits with a large time constant and high quality are of course relatively expensive. Accordingly, the time constant $r_2$ of the second RC circuit is held at a constant value by means of the control circuit 21. Circuit 21 is an 8-bit microcontroller available from Motorola as part number MC68HC705P6A. This development also makes it possible to use cost-effective RC circuits with capacitors of relatively low quality. Despite the additional costs for the control circuit the time-delay circuit 6 shown in FIG. 4 is in general more cost-effective to implement than if elements of comparably high quality are used for the RC circuit with a large time constant and the RC circuit with small time constant.

Figure 5:
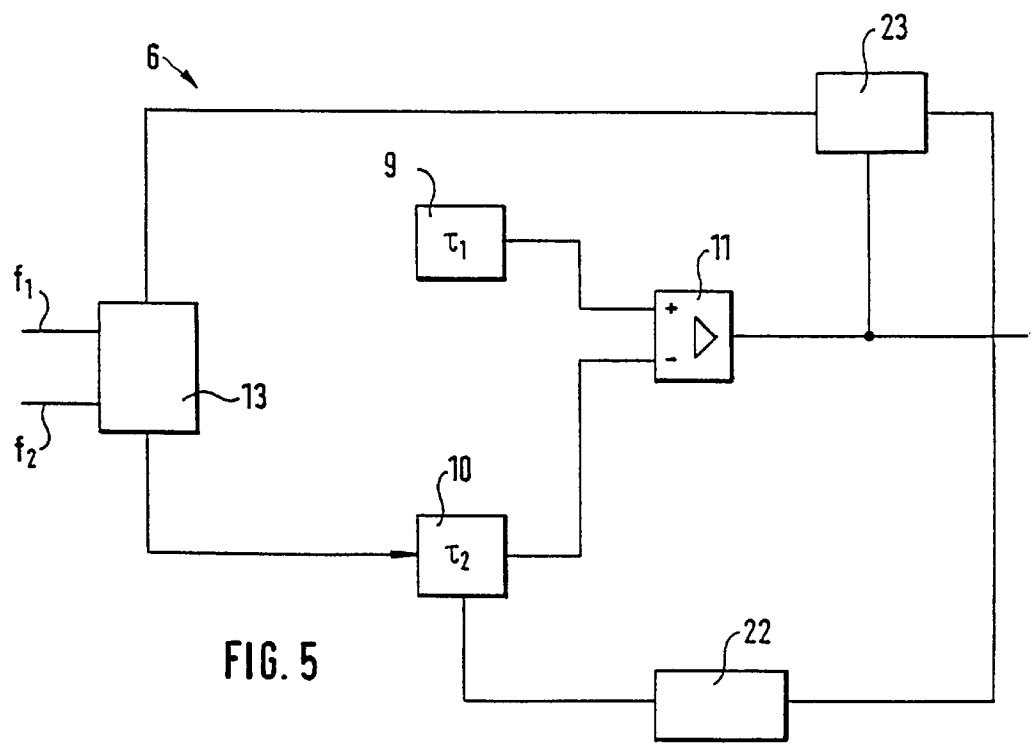
FIG. 5 is a block diagram of the time-delay circuit according to the present invention with control of the time extension or time delay.

In FIG. 5 a block diagram of a time-delay circuit 6 according to the invention is shown with control of the time extension factor $\Delta t$. This circuit is suitable for highly precise measurements since it holds the time delay $\Delta t$ between the sampling points to a constant predetermined value. Apart from the additional control loop which includes a phase detector 23 and a control circuit 22, the time-delay circuit 6 is the same as that shown in FIGS. 2 and 3. Control circuit 22 is an 8-bit microcontroller available from Motorola as part number MC68HC705P6A.

For the purpose of control the output signal of the comparator 11 and the square-wave signals of the transmission repetition frequency $f_1$ are fed to the inputs of the phase detector 23 which recognizes the phase shift between the two signals. Phase detector 23 provides a voltage signal having the phase shift which is supplied to the control circuit 22. As soon as deviations between the measured time extension $\Delta t$ and a predetermined time extension $\Delta t_{SOLL}$ occur, they are compensated for via the control circuit 22.

According to the present invention the transmission repetition frequency is not a constant quantity. Rather the sampling frequency is varied so that on the one hand the interference immunity of the apparatus is increased and on the other hand the emission of the apparatus is reduced. The increase of the immunity to interference is achieved by the influence of narrow-band interference signals which would reduce the sensitivity of measurement being reduced with the use of an extended frequency range. The reduction of the emission is caused by the fact that with utilization of an extended frequency range a large amount of energy is no longer radiated in a concentrated narrow-band frequency range but rather the small amounts of energy are distributed and made available over an extended frequency range. See U.S. Pat. No. 5,523,760.

Further, the transmission repetition frequency is functionally dependent on the distance of the antenna from the material or on the fill state of the material in the container. This development is in particular preferred if the measurement signals are not radiated freely in the direction of the surface of the material but rather are introduced into the material via a conductive element. In particular the functional dependence of the transmission repetition frequency is optimized so that the damping, depending on the transit path which the measurement signals experience if they are conducted along the conductive element, is equalized. As a consequence of this compensation it is possible to insure a comparably high measurement dynamics over the entire range of measurement.

What is claimed is:

1. An apparatus for the determination of the fill state of material in a container comprising: a signal generating/transmitting unit which generates high-frequency signals with a predetermined transmission repetition frequency ($f_1$) and transmits them in the direction of a surface of the material so that the high-frequency signals are reflected at the surface of the material, a receiving unit which receives reflected signals, a time-delay circuit which transforms the high-frequency signals into low-frequency signals, the time-delay circuit including a first circuit element having a first time constant ($T_1$) driven by input pulses synchronized with the transmission repetition frequency ($f_1$) and which generates a non-linear output signal, a second circuit element having a second time constant ($T_2$) greater than the first time constant ($T_1$) driven by pulses with a frequency ($f_2$) which is less than the transmission repetition frequency ($f_1$) and which generates a non-linear output signal, and a third circuit element which detects in each period of the transmission repetition frequency ($f_1$) an intersection of the output signal of the first circuit element and the output signal of the second circuit element and generates an output signal, and an evaluating unit which determines the fill state of the material in the container from the output signal of the third circuit element.

2. The apparatus according to claim 1, further including a fourth circuit element to insure that the input pulses to the first circuit element and the second circuit element have the same voltage level and the same ramp behavior.

3. The apparatus according to claim 1 wherein the first circuit element and the second circuit element are RC circuits having time constants $T_1=R_1C_1$ and $T_2=R_2C_2$.

4. The apparatus according to claim 3 wherein the time constants $T_1=R_1 C_1$, $T_2=R_2C_2$ of the first circuit element and the second circuit element are chosen so that the quotient of the time constant ($T_2$) and the time constant ($T_1$) correspond to a predetermined time delay factor.

5. The apparatus according to claim 3, further including a circuit component connected to the second circuit element to reduce the discharging time of the second circuit element.

6. The apparatus according to claim 1 wherein the third circuit element is a comparator.

7. The apparatus according to claim 6, further including a logical gate array having a first input signal with the frequency ($f_2$) and a second input signal which is the output signal of the third circuit element.

8. The apparatus according to claim 6 wherein the evaluation unit uses sampling points in the output signal of the third circuit element which lie in the linear range of the comparator.

9. The apparatus according to claim 1, further including a control circuit for controlling a sampling frequency of the low-frequency signals which is outside of a non-linear range of the third circuit element.

10. The apparatus according to claim 1, further including a first control circuit for holding he time constant ($T_2$) of the second circuit element to a constant value.

11. The apparatus according to claim 1, further including a second control circuit for holding a time extension factor ($\Delta t$) to a constant value.

12. The apparatus according to claim 1 wherein the transmission repetition frequency ($f_1$) is a variable quantity.

13. The apparatus according to claim 12 wherein the transmission repetition frequency ($f_1$) is a function of a distance from the antenna to the surface of the material.

* * * * *